(12) United States Patent
Vivek et al.

(10) Patent No.: US 8,319,398 B2
(45) Date of Patent: Nov. 27, 2012

(54) METHODS AND SYSTEMS TO FORM HIGH EFFICIENCY AND UNIFORM FRESNEL LENS ARRAYS FOR ULTRASONIC LIQUID MANIPULATION

(75) Inventors: Vibhu Vivek, Santa Clara, CA (US); Babur Hadimioglu, Angelholm (SE); Ratnakar Dadi, San Jose, CA (US)

(73) Assignee: Microsonic Systems Inc., San Jose, CA (US)

( * ) Notice: Subject to any disclaimer, the term of this patent is extended or adjusted under 35 U.S.C. 154(b) by 689 days.

(21) Appl. No.: 12/418,503

(22) Filed: Apr. 3, 2009

(65) Prior Publication Data
US 2009/0254289 A1    Oct. 8, 2009

Related U.S. Application Data

(60) Provisional application No. 61/042,566, filed on Apr. 4, 2008.

(51) Int. Cl.
  *H01L 41/08* (2006.01)
(52) U.S. Cl. .......................... 310/334; 310/335
(58) Field of Classification Search ................. 310/334, 310/335, 311, 369; 347/46, 68; 73/644, 73/596, 597, 601; 702/54; *H01L 41/08*
See application file for complete search history.

(56) References Cited

U.S. PATENT DOCUMENTS

| | | | |
|---|---|---|---|
| 3,934,460 A | 1/1976 | Sherwin et al. | |
| 4,033,178 A | 7/1977 | Holt et al. | |
| 5,041,849 A * | 8/1991 | Quate et al. | 310/335 |
| 5,111,220 A * | 5/1992 | Hadimioglu et al. | 310/335 |
| 5,121,141 A * | 6/1992 | Hadimoglu et al. | 310/335 |
| 5,278,028 A | 1/1994 | Hadimioglu et al. | |
| 5,423,220 A | 6/1995 | Finsterwald et al. | |
| 5,469,744 A | 11/1995 | Patton et al. | |
| 5,511,550 A | 4/1996 | Finsterwald et al. | |
| 5,565,113 A * | 10/1996 | Hadimioglu et al. | 347/46 |
| 5,669,971 A | 9/1997 | Bok et al. | |
| 5,938,612 A | 8/1999 | Kline-Schoder et al. | |
| 5,983,723 A | 11/1999 | Buckin et al. | |
| 6,364,454 B1 | 4/2002 | Hadimioglu | |

(Continued)

FOREIGN PATENT DOCUMENTS
WO    WO-2009124289 A2    10/2009

(Continued)

OTHER PUBLICATIONS

"International Application Serial No. PCT/US2009/039548, Search Report mailed Nov. 17, 2009", 3 pgs.

(Continued)

*Primary Examiner* — Thomas Dougherty
*Assistant Examiner* — Karen B Addison
(74) *Attorney, Agent, or Firm* — Schwegman Lundberg & Woessner, P.A.

(57) ABSTRACT

Apparatus and methods to form high efficiency and uniform Fresnel lens arrays for ultrasonic liquid manipulation are provided. An ultrasonic transducer array may be fabricated by forming top and bottom electrodes on top and bottom surfaces of a sensor plate. The ultrasonic transducer array may generate ultrasonic energy to manipulate one or more samples. Each of the top and bottom electrodes may be coupled to a radio frequency source and arranged to form one of a solid shape or a pattern. Additional apparatus and methods are disclosed.

26 Claims, 8 Drawing Sheets

U.S. PATENT DOCUMENTS

| | | |
|---|---|---|
| 6,368,482 B1 | 4/2002 | Oeftering et al. |
| 6,666,541 B2 | 12/2003 | Ellson |
| 6,682,214 B1 | 1/2004 | Vivek et al. |
| 6,948,843 B2 | 9/2005 | Laugharn, Jr. et al. |
| 7,080,557 B2 | 7/2006 | Adnan |
| 2002/0188200 A1 | 12/2002 | Mauchamp et al. |
| 2005/0061078 A1 | 3/2005 | Miller et al. |
| 2009/0249866 A1 | 10/2009 | Vivek |
| 2009/0249877 A1 | 10/2009 | Vivek |

FOREIGN PATENT DOCUMENTS

| | | |
|---|---|---|
| WO | WO-2009124290 A1 | 10/2009 |
| WO | WO-2009146140 A2 | 12/2009 |
| WO | WO-2009146140 A3 | 12/2009 |

OTHER PUBLICATIONS

"International Application Serial No. PCT/US2009/039548, Written Opinion mailed Nov. 17, 2009", 4 pgs.

Ellson, Richard, et al., "Transfer of low nanoliter volumes between microplates using focused acoustics—automation considerations", *Journal of the Association for Laboratory Automation*, 8(5), (Oct. 2003), 29-34.

Elrod, S. A, et al., "Nozzleless droplet formation with focused acoustic beams", *J. Appl. Phys.* 65, (1989), 3441-3447

Farnow, S. A, "Aocustic Applications of the Zone Plate", *Ph.D Dissertation, Stanford University*, (1976), 152 pgs.

Hadimioglu, B., et al., "Acoustic ink printing", *IEEE Ultrasonics Symposium, 1992. Proceedings*, (1992), 929-935

Hadimioglu, B., et al., "Acoustic ink printing: an application of ultrasonics for photographic quality printing at high speed", *2001 IEEE Ultrasonics Symposium*, (2001), 627-635.

Hadimioglu, B., et al., "High-efficiency Fresnel acoustic lenses", *IEEE Ultrasonics Symposium, 1993. Proceedings*, (1993), 579-582.

Oeftering, R. C, "Improving plating by use of intense acoustic beams", *NASA Tech Briefs*, (Mar. 2003), 2 pgs.

Vivek, V., et al., "Novel acoustic-wave micromixer", *Proc. IEEE Int. Micro Electro Mechanical Syst. Conf.*, (2000), 668-673.

Zou, Q., et al., "Water Needle—A new phenomenon for ink-jet printing", *IEEE 2001 International Conference on Solid-State Sensors and Actuators*, (2001), 6 pgs.

* cited by examiner

METHODS AND SYSTEMS TO FORM HIGH EFFICIENCY AND UNIFORM FRESNEL LENS ARRAYS FOR ULTRASONIC LIQUID MANIPULATION

RELATED APPLICATIONS

This patent application claims the benefit of priority under 35 U.S.C. Section 119(e), to U.S. Provisional Patent Application Ser. No. 61/042,566, filed on Apr. 4, 2008, which is incorporated herein by reference in its entirety.

BACKGROUND

Devices utilizing ultrasonic waves at megahertz (MHz) frequencies are used in many applications such as ultrasonic non-destructive evaluation of sample materials, ultrasonic imaging, ultrasonic ink printing, ultrasonic mixing, droplet dispensing for pharmaceutical and biological applications, and selective coating or plating of materials on substrates.

In virtually all of the above-mentioned applications, the core of the system consists of an ultrasonic transducer that converts electrical signals into ultrasonic signals and vice versa. The ultrasonic transducer is typically a piezoelectric plate formed between two metal electrodes. Other forms of ultrasonic transducers are also known in the art and may be used in various applications of ultrasonic energy.

BRIEF DESCRIPTION OF THE DRAWINGS

Some embodiments of the disclosed technology are illustrated by way of example and not limitation in the figures of the accompanying drawings in which.

DETAILED DESCRIPTION

Figure 1:
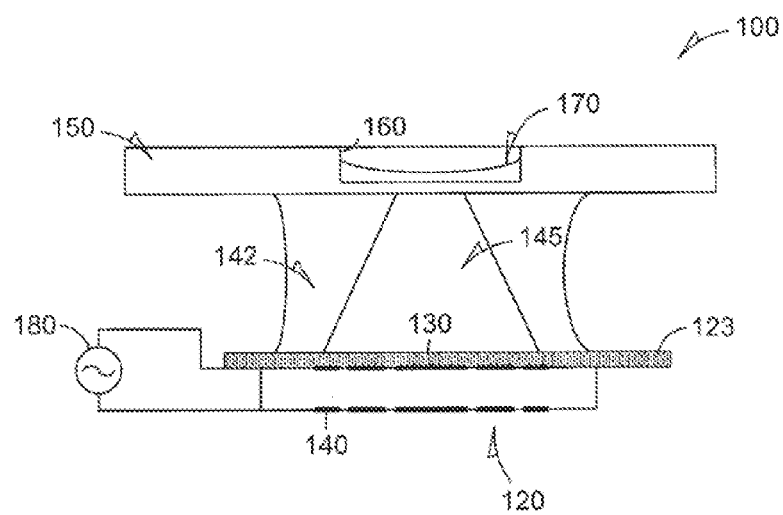
FIG. 1 is a diagram illustrating a cross-section of a typical prior art ultrasonic device using a half-wave-band source ultrasonic transducer.

Example apparatus and methods to form high efficiency and uniform Fresnel lens arrays for ultrasonic liquid manipulation will be described. In the following description for the purpose of explanation, numerous examples having example-specific details are set forth to provide an understanding of example embodiments. It will be evident, however, to one skilled in the art that the present examples may be practiced without these example-specific details, and/or with different combinations of the details than are given here.

Some example embodiments described herein may include forming an ultrasonic transducer array by forming a plurality of top and bottom electrodes on top and bottom surfaces of a sensor plate (e.g., a plate of a piezoelectric material). The ultrasonic transducer array may generate ultrasonic energy to manipulate one or more samples. The top and bottom electrodes may be coupled to a radio frequency (RF) source. Each of the top and bottom electrodes may be arranged to form one of a solid shape (e.g., a uniform continuous shape free of patterned structures within its boundaries) or a pattern.

The RF source may, for example, generate an RF signal in the form of a tone-burst. The frequency of the signal may be adjusted by sweeping the operating frequency across a frequency range (e.g., 0.1-1000 MHz). The signal may be suitably amplified, and it may then be applied between the electrodes of the ultrasonic transducer (also referred to, hereinafter, as "transducer"). The transducer may convert the electrical energy of the RF signal into the ultrasonic energy in the form of ultrasonic signals that are directed towards one or more samples. Depending on the application and particular design, the transducer may be attached to a buffer layer on one side, typically towards the sample object (e.g., a micro-well plate, or simply a "well plate"), and to a backing material on the opposing side. Again, depending on the application, a suitable ultrasonic converging element (also known as ultrasonic lens, hereinafter called a "converging element") may be formed on the transducer to concentrate the ultrasonic energy over a selected area of the sample object that retains a sample.

The form of the sample object depends on the particular application. In applications such as non-destructive evaluation or ultrasonic imaging, it is typically a solid material that can be examined by the ultrasonic signals. In fluidic applications such as mixing, the sample object is typically an industry-standard micro-well plate that holds the sample, e.g., fluid solvents that will be agitated by the ultrasonic signals. The micro-well plate typically has a relatively thin bottom to allow for efficient transmission of the ultrasonic waves into the sample. The fluid solvents may also contain particulates or solids to be mixed as well. In yet other biological applications, the samples may be placed on glass slides.

In virtually all of the applications described above, the sample object may be free to move, because the sample object is scanned relative to the transducer (e.g., in imaging applications), or in fluidic applications, it may be brought in and out of the instrument quickly, once the desired function (e.g., mixing or fluid transfer) is accomplished. The sample object is typically placed from a few millimeters to several centimeters away from the transducer assembly, near the zone where the ultrasonic energy may be concentrated.

Because air and virtually all gases do not transmit ultrasonic waves at megahertz frequencies efficiently, a medium (e.g., a coupling fluid, typically water) is applied between the transducer and the sample object to couple the ultrasonic energy (e.g., ultrasonic waves) efficiently between the transducer and the sample. In some of the applications described above, it is usually not desired to immerse all of the transducer and sample assemblies into the coupling fluid. A coupling between the transducer and the sample object may be controlled by changing an operating attribute of the RF source, including an operating power level.

In fluid mixing applications, for example, an ultrasonic excitation created within a liquid sample may have a pivotal role in mixing operation. Some attributes of the ultrasonic excitation created within the sample are controllable. For example, an intensity of the ultrasonic energy, a lateral component (e.g., in directions parallel to the plane of the transducer) of the ultrasonic field, and an axial thrust of the ultrasonic field may be controlled by changing operating attributes of the RF source. The operating attributes of the RF source may include an operating frequency and/or an operating power level. Increasing the intensity of the lateral component of the ultrasonic field relative to the axial component (perpendicular to the lateral component) may result in enhancing the mixing efficiency. The mixing efficiency may be taken to be, but not necessarily limited to, the ratio of the ultrasonic energy that is spent in mixing of the sample to the total ultrasonic energy generated by the ultrasonic transducer used in mixing the sample.

However, in some other applications such as drop ejection application (e.g., in printing processes) it may be beneficial to increase the intensity of the axial component of the ultrasonic field relative to the lateral component. In example embodiments disclosed herein, the operating frequency of the RF source may be controlled to allow dual purpose applications where both an enhanced lateral component and an enhanced axial component of the ultrasonic field are achievable in a single apparatus.

FIG. 1 is a diagram illustrating a cross-section of a typical prior art ultrasonic device 100 using a "half-wave-band source" ultrasonic transducer 120. The half-wave-band source ultrasonic transducer 120 (also known as a "Fresnel zone plate" type ultrasonic transducer) may simultaneously generate and focus ultrasonic waves used in an ultrasonic fluid manipulation device such as a fluidic mixer. The thickness of the ultrasonic transducer 120 and the patterning of the top and bottom electrodes 130 and 140 may be selected such that the ultrasonic transducer 120 operates at the desired RF frequency and focuses ultrasonic waves 145 at a pre-determined distance from the ultrasonic transducer 120, where a micro-well plate 150 is located.

The RF frequency is the frequency of RF signals generated by the RF source 180 and applied to the top and bottom electrodes 130 and 140. The ultrasonic transducer 120 is covered with a buffer layer 123 (e.g., an insulating layer) that may further improve coupling between the ultrasonic transducer 120 and a coupling fluid 142 and may have other uses as described hereinafter. The coupling fluid 142 may couple the ultrasonic waves 145 generated by the ultrasonic transducer 120 into a fluid sample 170 held in the well 160 of the well plate 150.

In order to process a large number of fluid samples with high throughput, the standard micro-plates used in most biological application contain a large number of wells, with 96, 384 or 1536 being some of the more commonly used numbers of micro-wells on a micro-well plate. In the present disclosure, embodiments of an apparatus to manipulate fluids in such micro-well plates will be introduced. The apparatus may have an array of substantially similar transducer elements, to achieve a high throughput of operation. To form a large array of nearly identical ultrasonic transducers, a plate of a piezoelectric material such as PZT (Lead Zirconate Titanate) is prepared. Suitable electrodes are patterned on either side of the plate to allow applying of the RF signals to the piezoelectric material. Transducers patterned in this fashion generate ultrasonic waves that are individually substantially uniform across a large array of devices.

However, one problem that may be observed in the operation of such an array of transducers in the present state of the art is due to the resistance of interconnections between electrodes of the transducer elements. Because a relatively large number of transducer elements are connected in parallel, the resistance of interconnects can add up to a considerable amount. It would be desirable then to fabricate the array of transducer elements to reduce the resistance of the interconnections by increasing their width to improve the uniformity, without degrading the efficiency of the array.

There are several approaches used to form lenses (e.g., focusing elements) to focus the ultrasonic waves generated by an ultrasonic transducer. One approach, generally employed when only one or a few focusing elements are to be used in the design, is to use a hemispherical optical cavity, similar to a standard optical lens. Such transducers can be fabricated by grinding a buffer layer (such as the buffer layer 123 of FIG. 1) attached to the ultrasonic transducer or by moulding the desired shape in a layer of epoxy or similar material used as the buffer layer.

Figure 2:
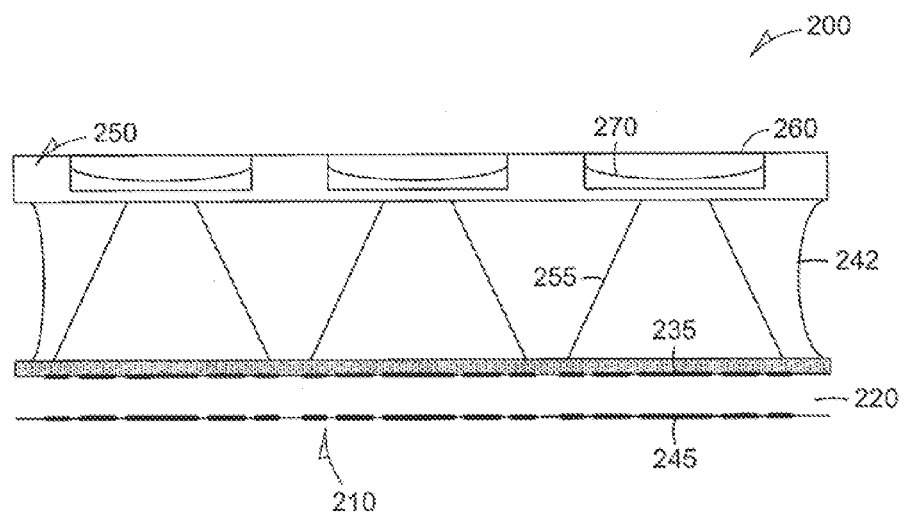
FIG. 2 is a diagram illustrating a cross-section of an example apparatus using an ultrasonic transducer array, according to various embodiments of the invention.

Alternatively, a "Fresnel zone plate" type of ultrasonic transducer can be formed on the piezoelectric material, by suitably patterning at least one of the top and bottom electrodes of each ultrasonic transducer element such that the ultrasonic waves concentrate in particular zones as they diffract from the transducer elements with patterned electrodes (see, for example, FIG. 2). These transducers have also been called "half-wave-band sources" in fluidic mixing applications.

Figure 5:
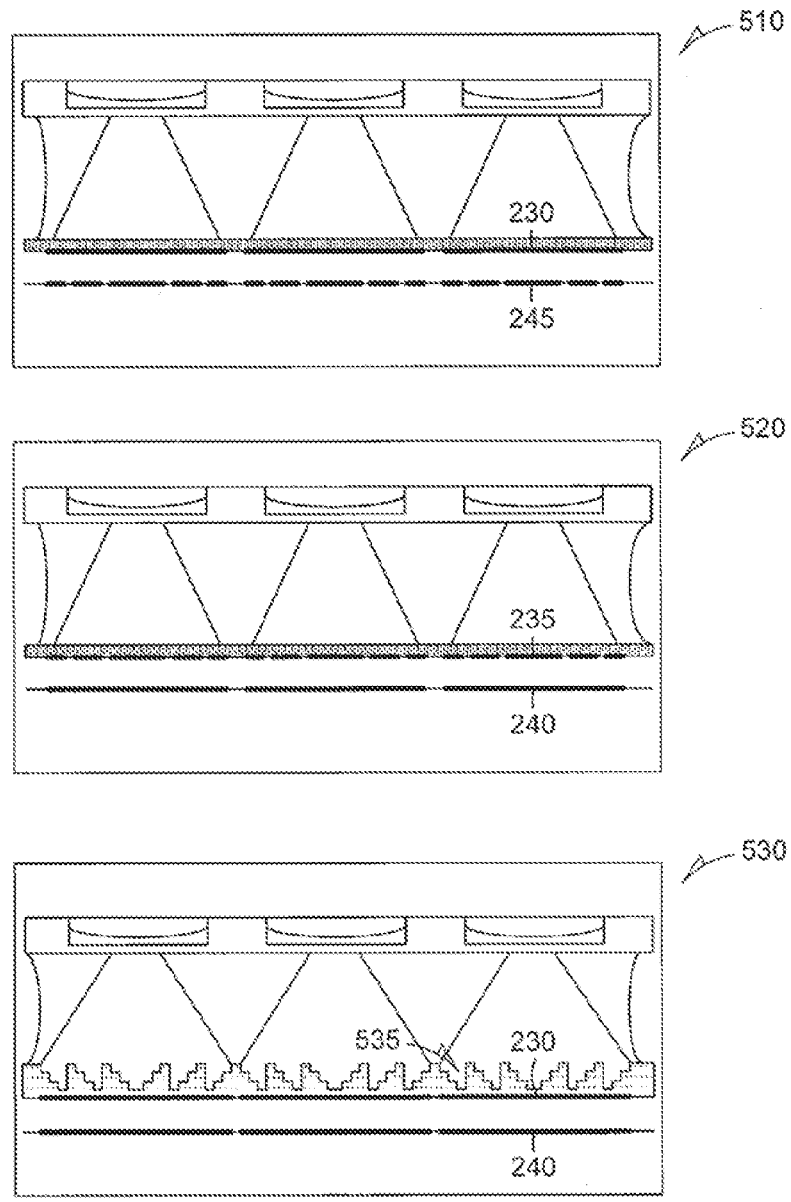
FIG. 5 is a diagram illustrating cross-sections of examples of the apparatus of FIG. 2, according to various embodiments of the invention.

An alternative method to form an ultrasonic lens is to use a binary Fresnel lens approach (see, for example, binary Fresnel lens 535 in FIG. 5). These lenses may be formed by etching into a material deposited on the ultrasonic transducer plate, by employing standard photolithography and thin-film processing steps commonly used in integrated circuit (IC) device fabrication.

All approaches taken in making lenses may involve some drawbacks in that they can present substantial difficulty when used in making an array, especially when the array is used in focusing ultrasonic waves with desired efficiency and uniformity across the array for certain ultrasonic fluid manipulation applications. It is relatively difficult to produce large arrays of hemispherical lenses with sufficient uniformity. The half-wave-band source transducers, for example, may have relatively poor efficiency of focusing, because a considerable percentage of the ultrasonic energy may be wasted by undesired diffraction orders (e.g., side lobes). The binary Fresnel lenses used in low frequency applications, for example, may not be easy to manufacture using the current techniques of thin-film deposition and etching. The low frequency applications may include fluid manipulation applications such as fluid mixing where the ultrasonic frequency may be at relatively low megahertz frequencies.

The thickness of each "step" in a binary Fresnel lens, such as the binary Fresnel lens 535 of FIG. 5, may be a fraction of the ultrasonic wavelength generated by the ultrasonic transducer. For example, at an operating frequency in the range of 1-10 MHz for an ultrasonic mixer device, the total thickness of the lens may be in the order of 0.1 millimeters to several millimeters, depending on the exact operating frequency and the type of material used to form the lens. Fabrication of devices with such thicknesses using standard thin-film processing techniques may be challenging. Because of these drawbacks, new methods to manufacture a large array of transducer-lens structures with good efficiency, good uniformity, and at low cost may be beneficial and are intended to be addressed by example embodiments discussed below. In order to simultaneously address a large number of sample fluids in a micro-well plate, the structure shown in FIG. 1 is not adequate.

FIG. 2 is a diagram illustrating a cross-section of an example apparatus 200 using an ultrasonic transducer array, according to various embodiments of the invention. The apparatus 200 may include an ultrasonic transducer array 210 formed by an array of ultrasonic transducers. Each ultrasonic transducer in the array may be formed by coating a number of top and bottom electrodes 235 and 245 on a sensor plate 220 using photolithographic processes. The sensor plate 220 may be a plate of piezoelectric material. Each ultrasonic transducer may face a micro-well 260 of a micro-well plate 250.

The micro-well 260 may contain a sample 270 (e.g., a liquid sample) coupled to the ultrasonic waves 255 generated by one of the ultrasonic transducers facing the micro-well 260. The top and bottom electrodes 235 and 245 may be conductively coupled to an RF source. FIG. 2 only shows a number of ultrasonic transducers and micro-wells of a large array. The ultrasonic transducers of the ultrasonic transducer array 210 may form half-wave-band sources to simultaneously address or irradiate a large number of micro-wells 260 via a coupling fluid 242. Such a parallel processing of all the samples in the micro-wells 260 makes the apparatus 200 an efficient ultrasonic fluid manipulation device, such as a fluidic mixer.

The half-wave-band source transducers in the ultrasonic transducer array 210 may be formed by configuring the top and bottom electrodes 235 and 245. The electrodes may be formed by one or more coatings or layers of conductive materials (e.g., aluminium, copper, silver, gold, or conductive polymers, etc.) on the sensor plate 220. Each electrode may have a solid shape or may be patterned to form concentric rings. The concentric rings may form a sector with a central angle, as discussed below.

Figure 3:
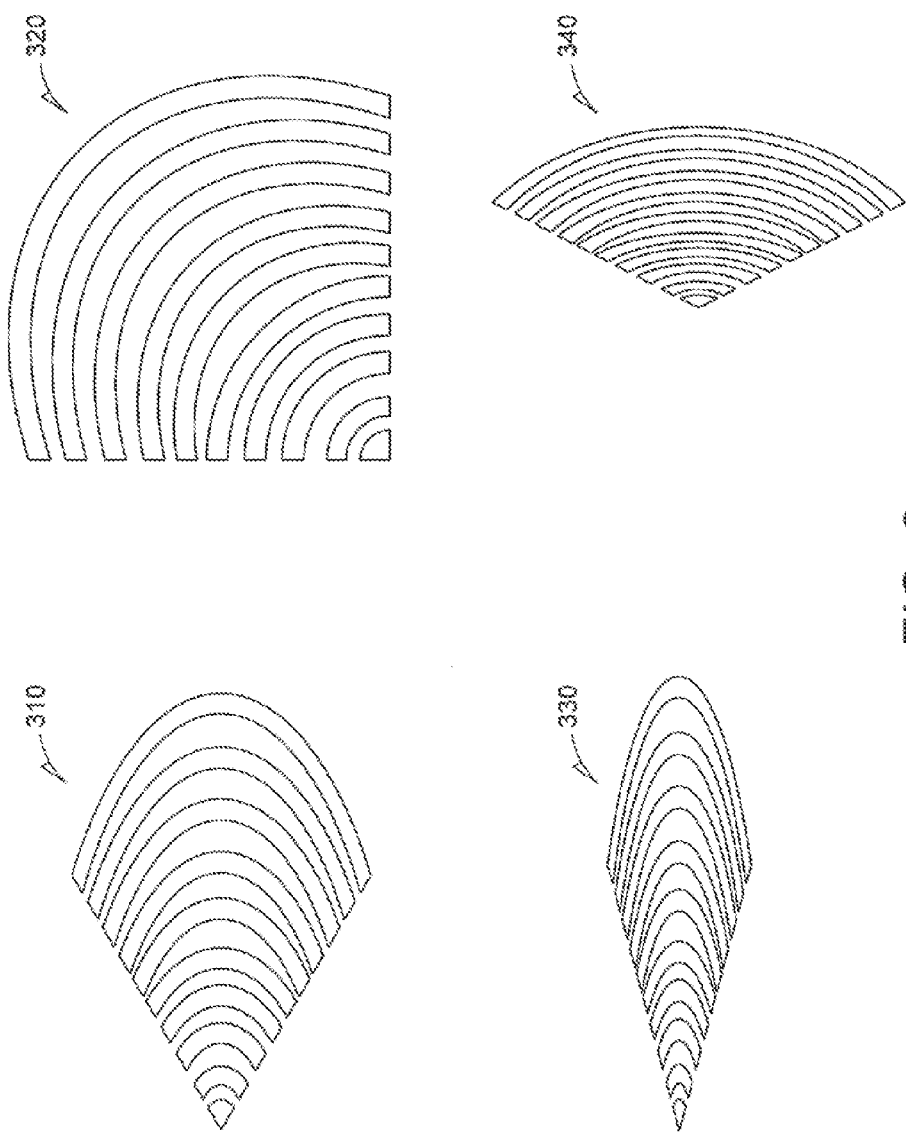
FIG. 3 is a diagram illustrating example configurations of patterned electrodes of the of the ultrasonic transducer array of FIG. 2, according to various embodiments of the invention.

FIG. 3 is a diagram illustrating example configurations of patterned electrodes of the ultrasonic transducer array of FIG. 2, according to various embodiments of the invention. A diagram 310 shows a sector with a central angle of 45 degrees. The concentric rings in diagram 310 transform in curvature from elliptical to circular, as they approach the center of the concentric rings. In diagram 320 the concentric rings form a central angle of 90 degrees, and their curvatures transform from hyperbolic to circular as the radii of curvatures decrease. The concentric rings in diagram 330 form a 30 degree central angle and their curvatures transform from parabolic to circular, as they approach the center. Diagram 340 represents concentric rings forming a 135 degrees central angle. The concentric rings in diagram 340 make a transformation in curvature from elliptical to circular as their radii decrease. The top and bottom electrodes 235 and 245 of FIG. 2 may assume any of these configurations but are not limited to these configurations.

Figure 4:
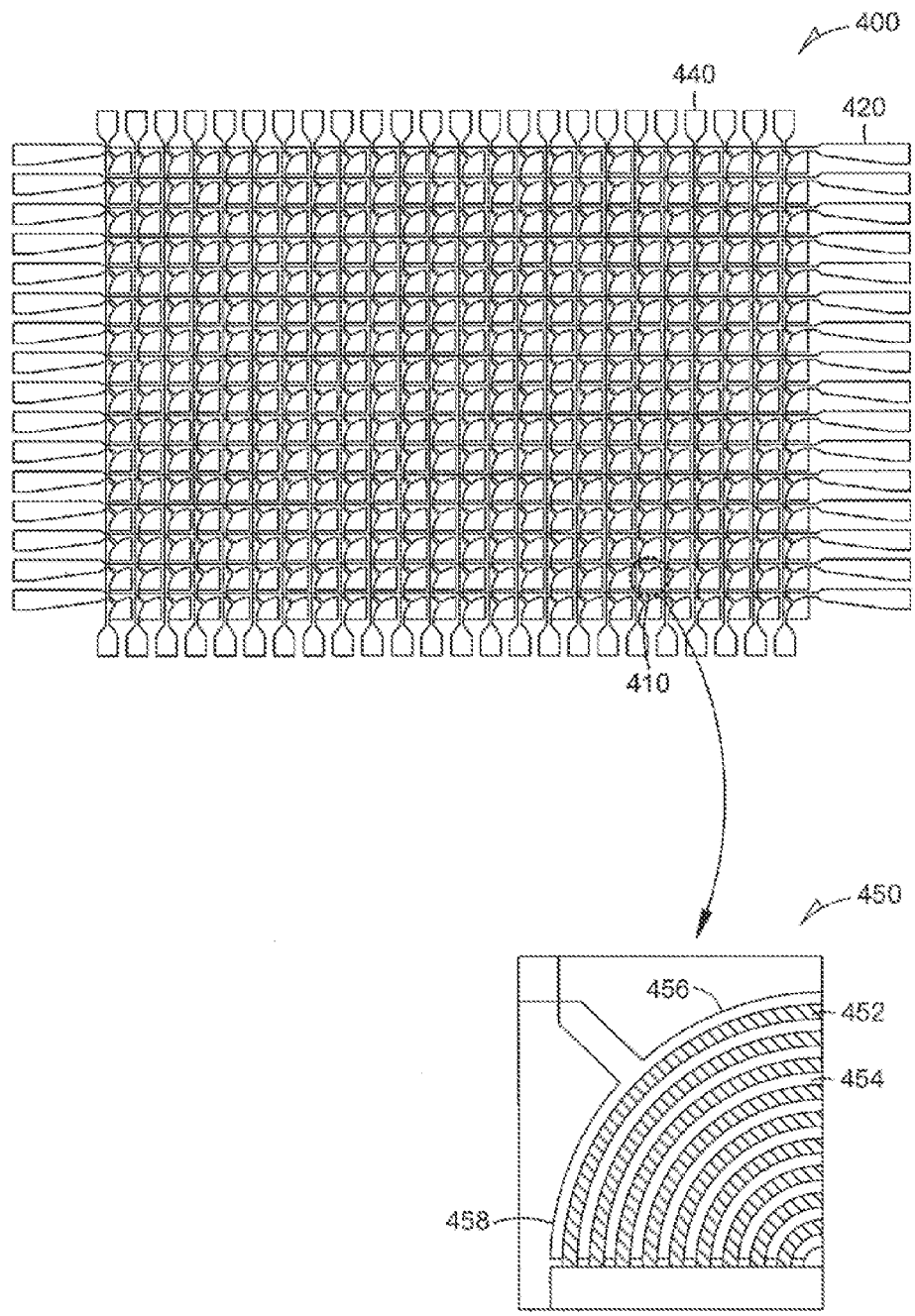
FIG. 4 is a diagram illustrating a top view of the example apparatus of FIG. 2, according to various embodiments of the invention.

FIG. 4 is a diagram illustrating a top view 400 of the example apparatus 200 of FIG. 2, according to various embodiments of the invention. The apparatus 200, as shown in the top view 400, may include an array of ultrasonic focusing elements 410 (e.g., electrodes forming half-wave-band sources) of the type shown in FIG. 2 designed according to an example embodiment. This example design involves addressing a standard micro-well plate with 384 micro-wells, arranged in a configuration of 16 rows by 24 columns. The rows and columns of the ultrasonic focusing elements 410 may be connected in parallel to an RF source (such as the RF source 180 of FIG. 1) via an array of coupling pads 420 and 440.

Given a relatively large number of transducers accessed by each row and column coupling pad, the resistance of interconnects between each ultrasonic element should be reduced to improve the uniformity of the array. Also the "stray" capacitance due to any overlap of the interconnections in the part of the plate outside of the area that is used to generate focusing ultrasonic waves should also be reduced as well. A blow-up 450 of the ultrasonic focusing element 410 reveals more details of the structure and connectivity of the concentric rings forming the top and bottom electrodes 452 and 454, respectively. The top and bottom electrodes 452 and 454 in this example are concentric circular rings forming a central angle of 90 degrees. The arrangement of the concentric rings and the interconnect lines 456 and 458 are such that the area between adjacent electrodes is utilized to substantially reduce interconnect resistance and stray capacitance due to overlap between the top and bottom electrodes 452 and 454. In example embodiments, the concentric ring configuration may be applied to either of the top and bottom electrodes 235 and 245 of FIG. 2.

FIG. 5 is a diagram illustrating cross-sections of examples of the apparatus 200 of FIG. 2, according to various embodiments of the invention. In the example apparatus 510, the top electrodes 230 have solid shapes (e.g., uniform continuous shapes free of patterned structures within their boundaries), whereas the bottom electrodes 245 are patterned. The example apparatus 520 shown in FIG. 5 may have the top electrodes 235 patterned, and the bottom electrodes 240 may have a solid shape. In example embodiments, the patterned top and bottom electrodes 235 and 245 may have any of the configurations shown in FIG. 3, but they are not limited to those configurations.

In the above-discussed example embodiments, the ultrasonic transducer array 210 formed by the configuration of electrodes, as shown in example apparatuses 200, 510, and 520 of FIGS. 2 and 5, may be substantially uniform. However the efficiency of focusing in such a transducer array may be improved. A further embodiment may include replacing the half-wave-band source (i.e., Fresnel zone plate type) transducer with a "binary" Fresnel lens PZT, as shown in the example apparatus 530, which may have a higher efficiency in focusing. The example apparatus 530 may be suitable for operation at low megahertz frequencies.

The binary Fresnel lenses 535 are defined in a layer of material formed on the top of the sensor plate 220 of FIG. 2 after formation of the top electrodes 230. Both of the top and bottom electrodes 230 and 240 as shown in the example apparatus 530 may have a solid shape. The lens material is selected such that a moulding process can be applied to define the Fresnel lens pattern. Several forms of potable epoxies and plastics such as polypropylene are example materials that can be used for this purpose, but the present application is not limited to these materials. The height of the lenses (e.g., binary Fresnel lenses 535) may be up to several hundreds of micrometers. The patterning of the lenses should be precise for uniformity and efficiency considerations. Therefore, precision manufacturing techniques developed for micro-electromechanical system applications may be applied to form the mould shape with substantially tight tolerances.

Although the structure shown in the binary Fresnel lenses 535 may have good efficiency and uniformity, it uses a moulding step on the piezoelectric plate, which may raise the cost of manufacturing of the transducer assembly. In an alternative example embodiment, forming of the binary Fresnel lenses may take place directly on the micro-well plate 250 of FIG. 2 as discussed below.

Figure 6:
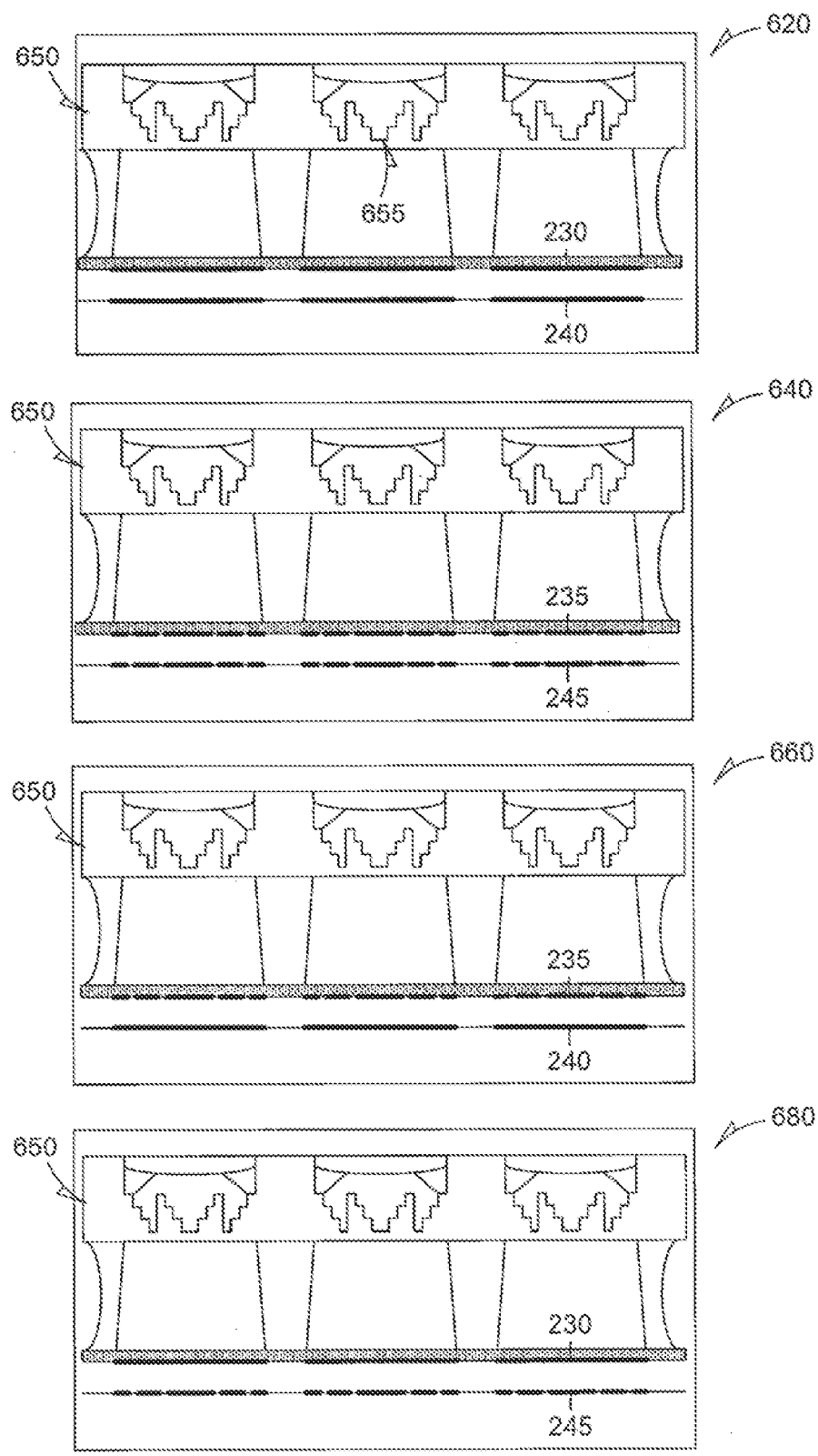
FIG. 6 is a diagram illustrating cross-sections of examples of the apparatus of FIG. 2, according to various embodiments of the invention.

FIG. 6 is a diagram illustrating cross-sections of examples of the apparatus 200 of FIG. 2, according to various embodiments of the invention. In an example apparatus 620, the top and bottom electrodes 230 and 240 have solid shapes with no patterning. However, in the example apparatus 620, the fact that the micro-well plates of the micro-well plate 650 are already fabricated using a moulding process is leveraged to form the binary Fresnel lens 655 at the time of fabricating the micro-well. The part of the mould that defines the binary Fresnel lens pattern may be fabricated using MEMS (micro-electro-mechanical system) processing to allow for precise definition of the binary Fresnel lens pattern.

The micro-well plate 650 including micro-wells with binary Fresnel lens moulding may be combined with half-wave-band source ultrasonic transducers to form double-lens configurations such as shown in example apparatuses 640, 660, and 680. In the example apparatus 640, the micro-well plate 650 is combined with an ultrasonic transducer array formed by patterned top and bottom electrodes 235 and 245, respectively. The example apparatus 660 uses the micro-well plate 650 in combination with an ultrasonic transducer array formed by patterned top electrodes 235 and solid shape bottom electrodes 240.

In the example apparatus 680, the double-lens configuration is realized by combining the micro-well plate 650 with an ultrasonic transducer array formed by solid shape electrodes 230 and patterned bottom electrodes 245. In example embodiments, the patterned electrodes in the apparatuses of FIG. 6 may have any of the configurations shown in FIG. 3, but they are not limited to those configurations. Also the patterned top and bottom electrodes 235 and 245 may have the same or different patterns. In yet another example embodiment, a variation of the ultrasonic lenses moulded with the micro-well plate may be considered, where the binary Fresnel lenses are defined on the bottom of the micro-well plate as shown FIG. 7 discussed below. This may make the geometry easier to define by moulding, than in the case where the binary Fresnel lens structures are formed in the bottom of a micro-well as in the apparatuses of FIG. 6, especially when the micro-well is deep.

Figure 7:
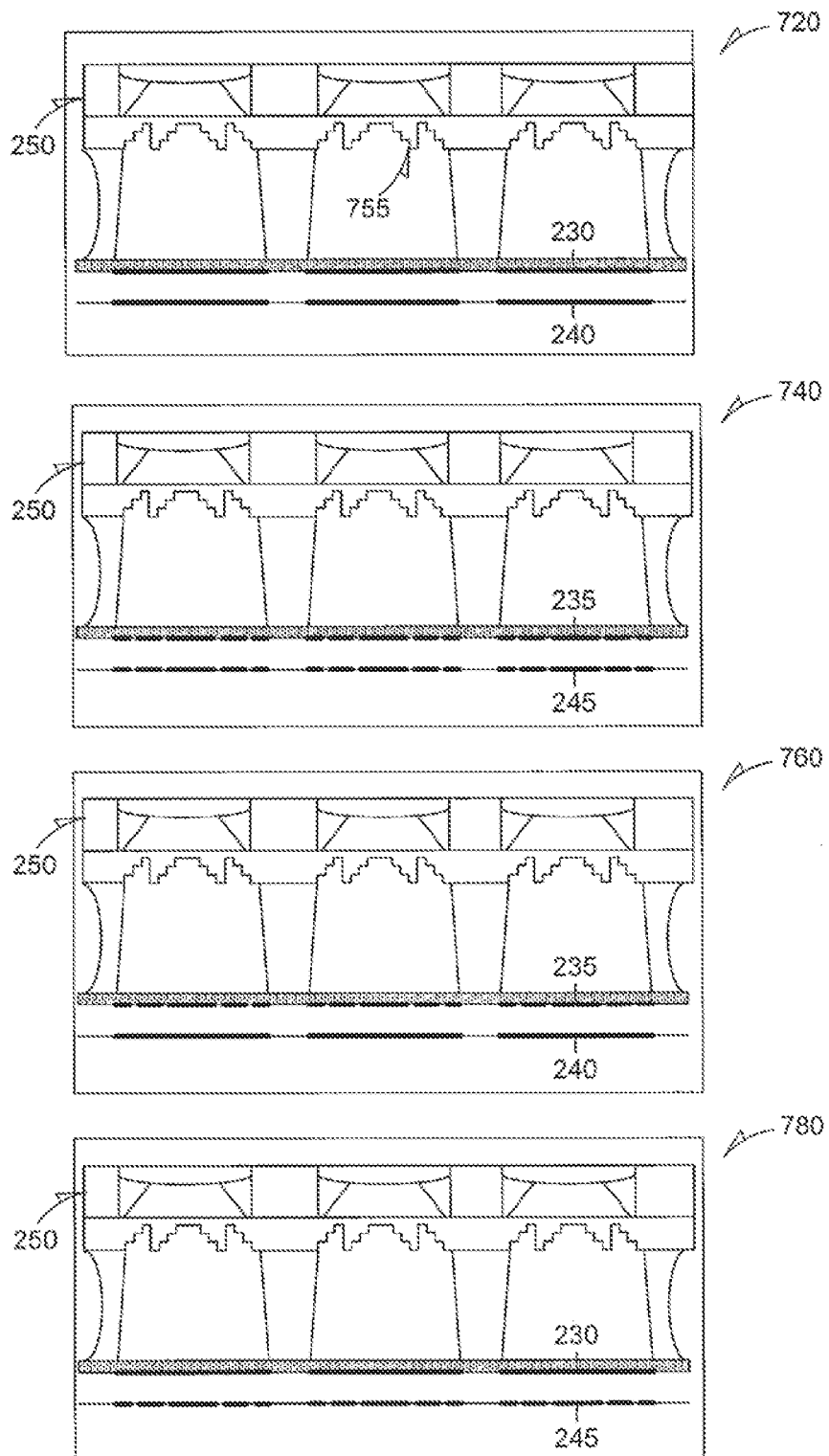
FIG. 7 is a diagram illustrating cross-sections of examples of the apparatus of FIG. 2, according to various embodiments of the invention.

FIG. 7 is a diagram illustrating cross-sections of examples of the apparatus 200 of FIG. 2, according to various embodiments of the invention. In the apparatuses of FIG. 7, the binary Fresnel lenses are facing the ultrasonic transducer arrays and the coupling fluid. In these cases, the Fresnel lens design equations may be modified to account for the refraction of the ultrasonic waves as they exit from the bottom of the micro-well and enter into the sample fluid in the micro-well.

In example apparatuses 720, 740, 760, and 780, various double-lens configurations are formed by combining a micro-well plate 250 covered at its bottom side with a binary Fresnel lens 755 with various embodiments of an ultrasonic transducer array formed by various combinations of solid shape top electrodes 230 or patterned top electrodes 235 with solid shape bottom electrodes 240 or patterned bottom electrodes 245. In example embodiments, the patterned electrodes in apparatuses of FIG. 7 may have any of the configurations shown in FIG. 3, but they are not limited to those configurations. Also, the patterned top and bottom electrodes 235 and 245 may have the same or different patterns. In yet another example embodiment the binary Fresnel lens moulding may be defined on the bottom side of a micro-well plate 650 of FIG. 6, where each micro-well already includes a binary Fresnel lens moulding formed at its bottom.

Figure 8:
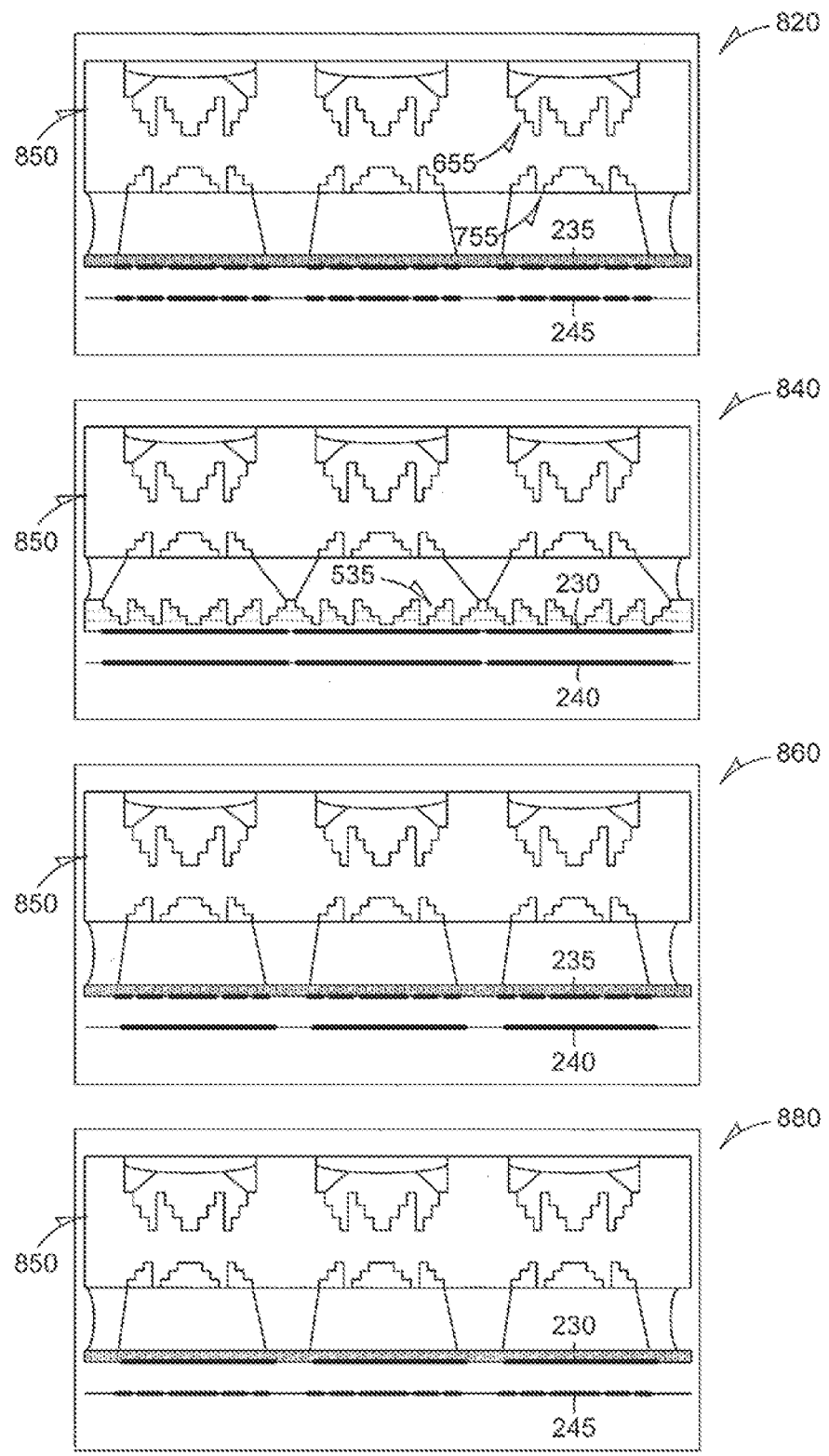
FIG. 8 is a diagram illustrating cross-sections of examples of the apparatus of FIG. 2, according to various embodiments of the invention.

FIG. 8 is a diagram illustrating cross-sections of examples of the apparatus 200 of FIG. 2, according to various embodiments of the invention. The micro-well plate 850 used in the apparatuses of FIG. 8 is formed by defining the binary Fresnel lenses 755 on a bottom side of a micro-well plate that includes micro-wells with binary Fresnel lens mouldings 655 at their bottom. The shape of moulding of the binary Fresnel lenses 655 may be similar, the same or different from the shape of moulding used in the binary Fresnel lenses 755. In example apparatuses 820, 860, and 880, various double-lens configurations are formed by combining the micro-well plate 850 with various embodiments of an ultrasonic transducer array formed by various combinations of solid shape top electrodes 230 or patterned top electrodes 235 with solid shape bottom electrodes 240 or patterned bottom electrodes 245. In the example apparatus 840 the ultrasonic transducer array with solid shape top and bottom electrodes 230 and 240, covered with the binary Fresnel lens moulding 535, is combined with the micro-well plate 850 to form the double-lens configuration. In example embodiments, the patterned electrodes in apparatuses of FIG. 7 may have any of the configurations shown in FIG. 3, but they are not limited to those configurations. Also the patterned top and bottom electrodes 235 and 245 may have the same or different patterns.

The methods and devices that are described in the concurrently submitted patent application entitled "Methods and Apparatus for Ultrasonic Coupling Using Ultrasonic Radiation Pressure" (incorporated herein by reference in its entirety) can be used in conjunction with example embodiments disclosed herein to improve the functionality and efficiency. The radiation pressure generated by the transducers in the arrays of the example embodiments can be utilized to achieve efficient ultrasonic coupling between the ultrasonic transducers and the micro-wells of the micro-well plates.

Figure 9:
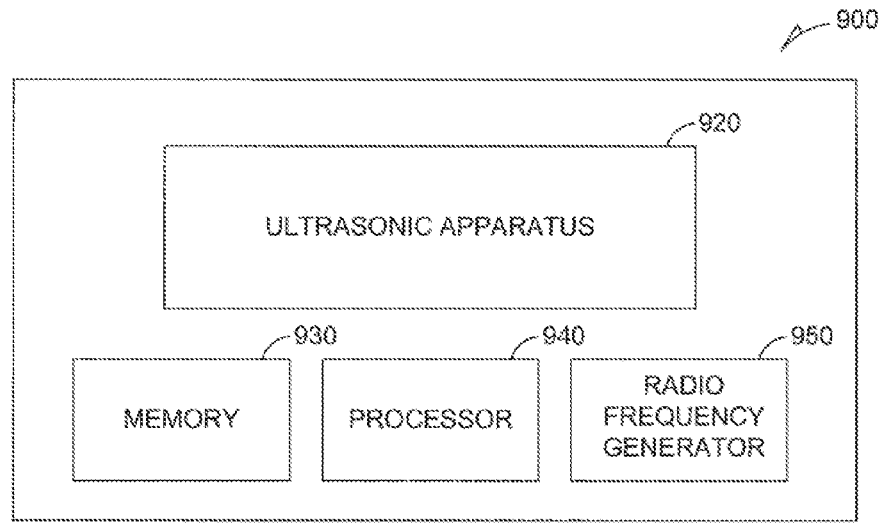
FIG. 9 is a diagram illustrating an example system to form high efficiency and uniform Fresnel lens arrays for ultrasonic liquid manipulation, according to various embodiments of the invention.

FIG. 9 is a diagram illustrating an example system 900 to form high efficiency and uniform Fresnel lens arrays for ultrasonic liquid manipulation, according to various embodiments of the invention. The system 900 may include an ultrasonic apparatus 920, a processor 940, a radio frequency generator 950 (such as the RF source 180 of FIG. 1), and memory 930. Example embodiments of the ultrasonic apparatus 920 may include example apparatuses shown in FIGS. 2 and 5-8. However, the ultrasonic apparatus 920 may not be limited to parts and components shown in the above-mentioned figures and may include auxiliary components not shown in those figures.

In example embodiments, the ultrasonic apparatus 920 may use the processor 940 to execute instructions (e.g., software) stored in the memory 930. The processor 940 may include a micro-processor, a central processing unit (CPU), and/or the like. The memory 930 may include rotating memory, random access memory (RAM), read-only memory (ROM), or flash type memory. The memory 930 may also store data related to the operation of the ultrasonic apparatus 920, for example, maintenance data, data related to samples analyzed, etc. The instructions, for example, may include software to control various parts of the ultrasonic apparatus 920, the radio frequency generator 950 and/or one or more pumps that may propel a coupling fluid (such as a coupling fluid 242 of FIG. 2) into a fluid container that contains the coupling fluid.

Figure 10:
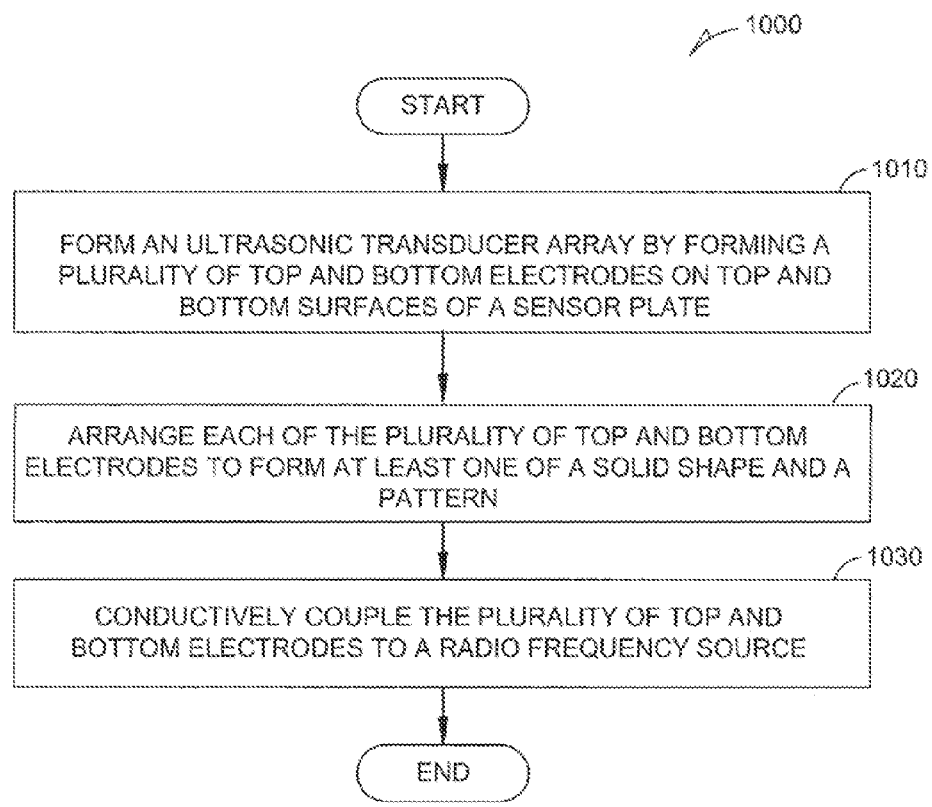
FIG. 10 is a flow diagram illustrating an example method to form high efficiency and uniform Fresnel lens arrays for ultrasonic liquid manipulation, according to various embodiments of the invention.

FIG. 10 is a flow diagram illustrating an example method 1000 to form high efficiency and uniform Fresnel lens arrays for ultrasonic liquid manipulation, according to various embodiments of the invention. In 1010, the ultrasonic transducer array 210 (or any of the ultrasonic transducer arrays shown in FIGS. 5-8) may be formed by fabricating a number of top and bottom electrodes (e.g., top and bottom electrodes, 230 and 240 or various configurations shown in FIGS. 5-8) on top and bottom surfaces of the sensor plate 220. The ultrasonic transducer array 210 may generate ultrasonic energy in the form of ultrasonic waves 255 to manipulate a number of samples contained in micro-wells 260 (or micro-wells shown in FIGS. 5-8).

In 1020, each of the top and bottom electrodes may be arranged to form either a solid shape or a pattern. The pattern may include any of the concentric ring configurations shown in FIG. 3, but it is not limited to those configurations. Various combinations of solid shape or pattered electrodes may be used as discussed above with regard to FIGS. 2 and 5-8. Although the flow diagram of FIG. 10 shows an "End", the method may be performed continuously if desired.

In 1030, the top and bottom electrodes may be conductively coupled to an RF source, such as the RF source 180 of FIG. 1. Although the embodiments described above show structures with the coupling medium nominally making contact with the sample object, it is also possible to use example embodiments of the present subject matter in configurations wherein the coupling fluid is not making contact with the sample object, such as in structures shown in FIG. 2 of the concurrently submitted patent application entitled "Methods and Systems for Ultrasonic Coupling Using Ultrasonic Radiation Pressure" (incorporated herein by reference in its entirety). Example embodiments of the present subject matter may be utilized to improve the functionality and efficiency of ultrasonic liquid manipulation by dislodging any potential bubbles trapped between the transducer and sample objects, without using excessive forced flow of the coupling fluid with an external drive mechanism. Micro-well plates with non-flat bottoms that are used in certain biological applications are particularly prone to trapped bubbles. Hence, example embodiments of the present subject matter may improve the efficiency of coupling in those applications.

Embodiments of methods and apparatus to form high efficiency and uniform Fresnel lens arrays for ultrasonic liquid manipulation have been described. Although the inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. An apparatus for manipulating samples comprising:
   an ultrasonic transducer array formed by forming a plurality of top and bottom electrodes on a top and a bottom surface of a sensor plate,
   the ultrasonic transducer array being configured to generate ultrasonic energy to manipulate a plurality of samples,
   the plurality of top and bottom electrodes being conductively coupled to a radio frequency source,
   each of the plurality of top and bottom electrodes forming a solid shape, and
   a binary Fresnel lens being formed on each of the top electrodes.

2. The apparatus of claim 1, wherein the sensor plate comprises a piezoelectric material, and wherein the plurality of top and bottom electrodes comprises electrically conductive material.

3. The apparatus of claim 1, further comprising a well plate including at least one of:
   a plurality of wells on a top surface of the well plate,
   a plurality of wells on a top surface of the well plate, wherein each well of the plurality of wells is shaped to form a binary Fresnel lens, and
   a plurality of binary Fresnel lenses created on a bottom surface of the well plate.

4. The apparatus of claim 3, wherein the ultrasonic transducer array is coupled to the well plate via a coupling medium comprising a fluid, and wherein a coupling between the transducer and the well plate is controlled by changing an operating attribute of the radio frequency source including an operating power level.

5. The apparatus of claim 1, wherein the radio frequency source generates signals in a frequency range of 0.1 MHz to 1000 MHz.

6. The apparatus of claim 1, wherein an attribute of an ultrasonic excitation created within a sample is controllable, the attribute including at least one of an intensity of the ultrasonic energy, a lateral component of an ultrasonic field, and an axial thrust of the ultrasonic field.

7. The apparatus of claim 6, wherein at least one attribute of the ultrasonic excitation is controlled by changing an operating attribute of the radio frequency source including at least one of an operating, frequency and an operating power level.

8. An apparatus for manipulating samples comprising:
   an ultrasonic transducer array formed by forming a plurality of top and bottom electrodes on a top and a bottom surface of a sensor plate,
   the ultrasonic transducer array being configured to generate ultrasonic energy to manipulate a plurality of samples,
   the plurality of top and bottom electrodes being conductively coupled to a radio frequency source, and each of the plurality of top and bottom electrodes forming a pattern, the pattern comprising a sector of a plurality of concentric rings.

9. The apparatus of claim 8, wherein the sensor plate comprises a piezoelectric material, and wherein the plurality of top and bottom electrodes comprises electrically conductive material.

10. The apparatus of claim 8, wherein the sector comprises a central angle, the central angle including all angles between 0 and 360 degrees.

11. The apparatus of claim 10, wherein curvatures of the plurality of concentric rings transform as radii of the rings increase, the curvature transformation including changing from circular curvature to one of an elliptical, a hyperbolic, or a parabolic curvature.

12. The apparatus of claim 11, wherein the curvature transformation depends on the central angle.

13. The apparatus of claim 8, further comprising a well plate including at least one of:
   a plurality of wells on a top surface of the well plate,
   a plurality of wells on a top surface of the well plate, wherein each well of the plurality of wells is shaped to form a binary Fresnel lens, and
   a plurality of binary Fresnel lenses created on a bottom surface of the well plate.

14. The apparatus of claim 13, wherein the ultrasonic transducer array is coupled to the well plate via a coupling medium comprising a fluid, and wherein a coupling between the transducer and the well plate is controlled by changing an operating attribute of the radio frequency source including an operating power level.

15. The apparatus of claim 8, wherein the radio frequency source generates signals in a frequency range of 0.1 MHz to 1000 MHz.

16. The apparatus of claim 8, wherein an attribute of an ultrasonic excitation created within a sample is controllable, the attribute including at least one of an intensity of the ultrasonic energy, a lateral component of an ultrasonic field, and an axial thrust of the ultrasonic field.

17. The apparatus of claim 16, wherein at least one attribute of the ultrasonic excitation is controlled by changing an operating attribute of the radio frequency source including at least one of an operating frequency and an operating power level.

18. An apparatus for manipulating samples comprising:
   an ultrasonic transducer array formed by forming a plurality of top and bottom electrodes on a top and a bottom surface of a sensor plate, the ultrasonic transducer array being configured to generate ultrasonic energy to manipulate a plurality of samples, the plurality of top and bottom electrodes being conductively coupled to a radio frequency source, and each of the plurality of top and bottom electrodes forming one of a solid shape or a pattern; and
   a well plate including at least one of:
      a plurality of wells on a top surface of the well plate,
      a plurality of wells on a top surface of the well plate, wherein each well of the plurality of wells is shaped to form a binary Fresnel lens, and
      a plurality of binary Fresnel lenses created on a bottom surface of the well plate.

19. The apparatus of claim 18, wherein the sensor plate comprises a piezoelectric material, and wherein the plurality of top and bottom electrodes comprises electrically conductive material.

20. The apparatus of claim 18, wherein each of the top and bottom electrodes forms a pattern, the pattern comprising a sector of a plurality of concentric rings, the sector comprising a central angle, and the central angle including all angles between 0 and 360 degrees.

21. The apparatus of claim 20, wherein curvatures of the plurality of concentric rings transform as radii of the rings increase, the curvature transformation including changing from circular curvature to one of an elliptical, a hyperbolic, or a parabolic curvature.

22. The apparatus of claim 21, wherein the curvature transformation depends on the central angle.

23. The apparatus of claim 18, wherein the ultrasonic transducer array is coupled to the well plate via a coupling medium comprising a fluid, and wherein a coupling between the transducer and the well plate is controlled by changing an operating attribute of the radio frequency source including an operating power level.

24. The apparatus of claim 18, wherein the radio frequency source generates signals a frequency range of 0.1 MHz to 1000 MHz.

25. The apparatus of claim 18, wherein an attribute of an ultrasonic excitation created within a sample is controllable, the attribute including at least one of an intensity of the ultrasonic energy, a lateral component of an ultrasonic field, and an axial thrust of the ultrasonic field.

26. The apparatus of claim 25, wherein at least one attribute of the ultrasonic excitation is controlled by changing an operating attribute of the radio frequency source including at least one of an operating frequency and an operating power level.

* * * * *